Figure 5:
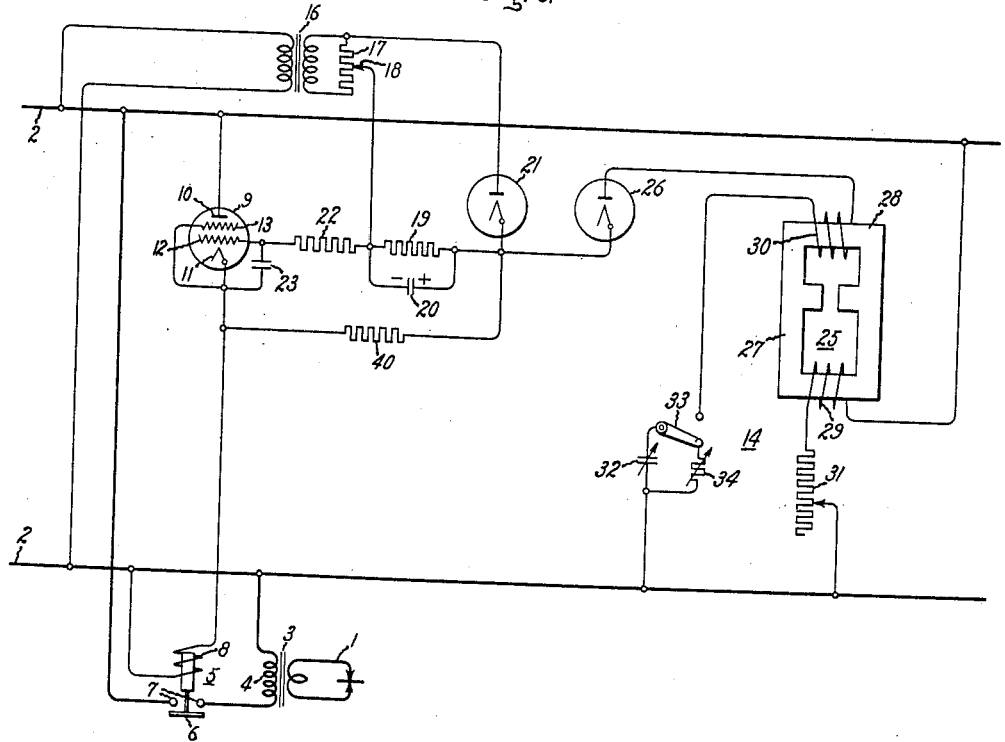

Jan. 6, 1942.    G. W. GARMAN    2,269,151
ELECTRIC CONTROL CIRCUITS
Filed April 24, 1937    2 Sheets-Sheet 1
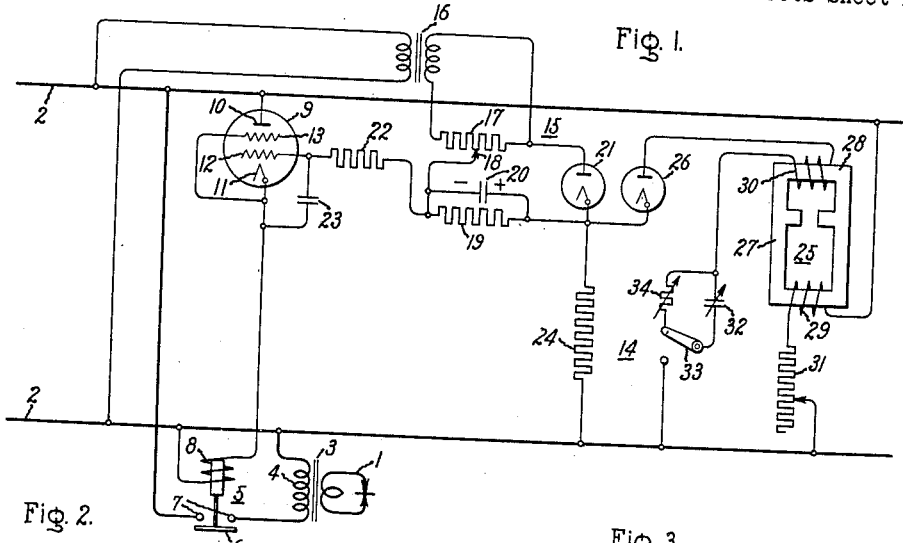
Fig. 1.
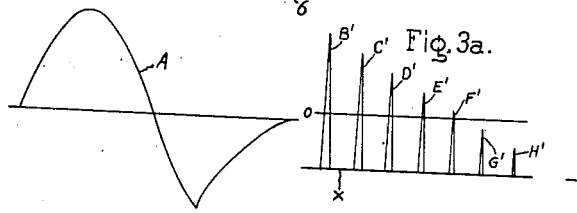
Fig. 2.    Fig. 3a.    Fig. 3.
Fig. 4.
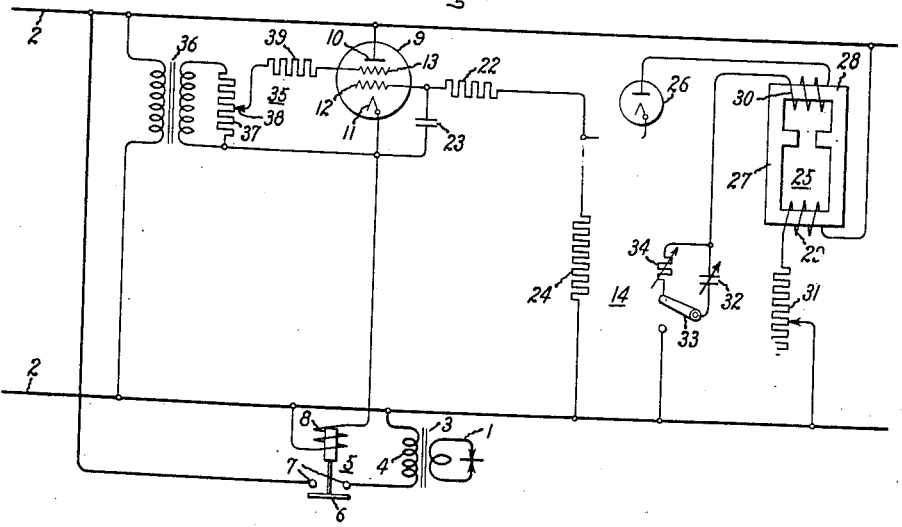
Inventor:
George W. Garman,
by Harry E. Dunbar
His Attorney.

Jan. 6, 1942.                G. W. GARMAN                 2,269,151
                         ELECTRIC CONTROL CIRCUITS
                          Filed April 24, 1937          2 Sheets-Sheet 2

Inventor:
George W. Garman,
by Harry E. Dunham
His Attorney.

Patented Jan. 6, 1942

2,269,151

UNITED STATES PATENT OFFICE 2,269,151

ELECTRIC CONTROL CIRCUITS

George W. Garman, Scotia, N. Y., assignor to General Electric Company, a corporation of New York Application April 24, 1937, Serial No. 138,816

14 Claims. (Cl. 250—27)

My invention relates to electric control circuits and more particularly to control circuits for electric valve apparatus.

In control circuits for electric valve apparatus, it is frequently desirable to provide arrangements to effect energization of a load circuit or a load device during an accurately determinable interval of time. It is also frequently highly desirable to effect energization of a load device or of an associated load circuit at an accurately determinable instant. These requirements are of particular importance in welding circuits energized from an alternating current circuit where it is desirable to effect energization of the welding circuit at a predetermined time in the cycle of alternating voltage, and where it is desirable to control precisely the amount of energy supplied to the welding circuit during a predetermined interval of time. Heretofore in control circuits of this nature it was found difficult to provide these control characteristics without employing auxiliary apparatus which was excessively expensive and which required apparatus of inordinate size and rating relative to the amount of energy to be controlled. Furthermore, the prior art arrangements have necessitated the use of a large number of auxiliary or control devices to effect this essential precision and accuracy of control.

It is an object of my invention to provide a new and improved electric valve circuit.

It is another object of my invention to provide a new and improved control circuit for electric valve apparatus.

It is a further object of my invention to provide a new and improved control circuit for effecting energization of a load circuit at an accurately determinable time during a cycle of voltage of an alternating current circuit.

It is a still further object of my invention to provide a new and improved control circuit for electric valve apparatus by virtue of which the period of energization of a welding circuit from an alternating current supply circuit is accurately determinable.

In accordance with the illustrated embodiments of my invention, I provide circuits for accurately and precisely controlling the time and period of energization of a load circuit such as a welding circuit. The energization of the load circuit is controlled by a translating device, such as a relay or an electromagnetic contactor, which in turn is controlled by an electric valve means. I provide a control circuit for the electric valve by virtue of which the electric valve is rendered conductive at a predetermined time during the cycle of applied voltage, and whereby the interval of time during which energy is supplied to the load circuit from an alternating current supply circuit is accurately determinable. More particularly, a bias voltage is applied to control means of the electric valve tending to maintain the electric valve nonconductive and the electric valve is rendered conductive for a predetermined maximum number of half cycles of voltage of the supply circuit by impressing thereon a predetermined number of impulses of voltage each sufficient to overcome the bias voltage to render the electric valve conductive. An impedance element is connected in the control circuit and is energized from a source of alternating current of peaked wave form through a capacitance and a unidirectional conducting device. The impedance element introduces in the control circuit the train of impulses of positive voltage which overcome the bias voltage.

In one embodiment of my invention I provide an electric valve means having two control members for conjointly controlling the conductivity of the electric valve means. In this arrangement a bias voltage applied to one of the control members tends to maintain the electric valve nonconductive and the train of impulses of positive voltage are applied to the other control member to render the electric valve conductive for a predetermined time or during a predetermined number of half cycles of voltage of the alternating current circuit.

Another feature of my invention is the employment of electric valve means for energizing a circuit controlling means, such as a relay or contactor having an inductive actuating coil for connecting a supply circuit to a load circuit and in which the conductivity of the electric valve is controlled by impressing on the control member thereof a bias voltage ending to maintain the electric valve nonconductive and in which there is provided an arrangement for impressing on the control member a series or train of impulses of positive voltage for rendering the electric valve means conductive to energize the actuating coil for a predetermined interval of time. The impulses of positive voltage impressed on the control member are furnished by supplying current to an impedance element connected in series relation with the actuating coil, a unidirectional conducting device, a capacitance and a source of alternating voltage of peaked wave form which charges the capacitance through these elements. The unidirectional conducting device is connected in the control circuit so that the reactive voltage appearing across the actuating coil after each period of energization is employed to establish an additional or cumulative charge on the capacitance to effect a substantial increase in the stored energy thereof, and to provide thereby a control circuit in which the time of energization of the load circuit is very accurately determinable.

Figure 6:
Figure 7:
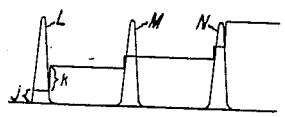
Figure 8:
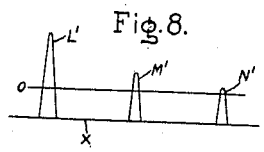

For a better understanding of my invention, reference may be had to the following description taken in connection with the accompanying drawings, and its scope will be pointed out in the appended claims. Fig. 1 of the accompanying drawings shows an embodiment of my invention as applied to an electric valve control circuit for controlling the transfer of energy from an alternating current circuit to a welding circuit, and Figs. 2, 3 and 3a represent certain operating characteristics thereof. Fig. 4 is a modification of the arrangement shown in Fig. 1 in which the control of the electric valve means is accomplished by controlling the energization of two control members of the electric valve means. Fig. 5 diagrammatically shows another embodiment of my invention in which the reactive voltage across the inductive element of the circuit controlling means is employed to feed energy into the control circuit for the electric valve means, and Figs. 6, 7 and 8 represent certain operating characteristics thereof.

In Fig. 1 of the accompanying drawings there is shown an embodiment of my invention as applied to a control system for controlling an electric valve circuit. More specifically, a load circuit such as a welding circuit 1 is energized from an alternating current circuit 2 through a transformer 3 having a primary winding 4 which is arranged to be connected across the alternating current circuit 2. As a means for connecting the primary winding 4 of transformer 3 to the alternating current circuit 2, I employ a suitable circuit controlling means or a translating device such as a relay or contactor 5 having an armature or bridging contact 6, stationary contacts 7 and an inductive actuating coil 8. An electric valve means 9, having a controlled discharge path, is connected to be energized from the alternating current circuit 2 to supply current to the actuating coil 8. The electric valve means 9 may be of the type employing an ionizable medium such as a gas or a vapor and includes an anode 10, a cathode 11 and a control member or grid 12. The electric valve means 9 may also include an additional control member such as a screen grid 13 which is connected to the cathode 11. Although in the arrangement of my invention shown in Fig. 1 I have employed only one electric valve means for supplying current to the actuating coil 8 of contactor 5, it is to be understood that I may employ, if desired, suitable electric valve means such as a pair of oppositely disposed electric valve means to supply current to the actuating coil 8 during both half cycles of voltage of the alternating current circuit 2. It is also to be understood that, if desired, I may employ electric valve means of the high vacuum type to control the energization of the actuating coil 8.

As an agency for controlling the conductivity of the electric valve means 9 to render the electric valve means conductive at a predetermined instant in the cycle of voltage applied thereto and to maintain the electric valve conductive for a predetermined consecutive number of positive half cycles of voltage of the alternating current circuit 2, I provide a control circuit 14 including a source of negative unidirectional biasing voltage which is impressed on control member 12 tending to maintain the electric valve 9 nonconductive. This source of negative bias voltage may be provided by any of the arrangements well known in the art and I have chosen to show this arrangement as comprising a circuit 15 including a transformer 16 which is energized from the alternating current circuit 2, a voltage divider including a resistance 17 having an adjustable contact 18, a resistance 19, a capacitance 20 connected in shunt relation with the resistance 19 and a unidirectional conducting device 21 for energizing the resistance 19 and the capacitance 20 from the voltage divider. The unidirectional conducting device 21 may be of the electronic type or of the contact-rectifying type and is connected in the circuit 15 so that the left-hand plate of the capacitance 20 is charged negatively tending to impress on the control member 12 of electric valve means 9 a negative unidirectional bias voltage. A suitable current limiting resistance 22 may be connected in series relation with the resistance 19 and the control member 12, and a capacitance 23 may be connected across the cathode 11 and control member 12 of electric valve 9 to absorb extraneous transient voltages which may exist in the control circuit 14.

I provide an impedance element such as a resistance 24 for introducing in the control circuit 14 positive impulses of voltage sufficient in magnitude to overcome the negative bias voltage provided by resistance 19 and capacitance 20 to render the electric valve means 9 conductive. The resistance 24 is energized by a suitable source of periodic current so that the voltage appearing across the terminals of this resistance is sufficient to render the electric valve 9 conductive at predetermined times. This source of periodic voltage may be supplied by an alternating current circuit or may be provided by an impulse generator, and in the arrangement of my invention diagrammatically shown in Fig. 1 I employ an alternating voltage of peaked wave form supplied by a saturable inductive device 25 and a unidirectional conducting device 26. The saturable inductive device 25 is provided with a core member 27, a saturable section 28, a primary exciting winding 29 and a secondary control winding 30 which is associated with the saturable section 28. The primary actuating winding 29 may be energized from the alternating current circuit 2 through a suitable adjustable resistance 31. The adjustable resistance 31 provides an arrangement for controlling the phase of the alternating voltage of peaked wave form generated in secondary winding 30 relative to the voltage of the alternating current circuit 2. As a means for controlling the number of impulses of voltage appearing across the terminals of resistance 24 which are effective to render the electric valve means conductive, I employ an adjustable energy storage device such as a capacitance 32 which is connected in series relation with the resistance 24, unidirectional conducting device 26 and secondary winding 30 of inductive device 25. A suitable circuit controlling means, such as a switch 33, may be connected in series relation between the capacitance 32 and resistance 24 and may be employed to close a discharge circuit for the capacitance 32. The discharge circuit may include an adjustable resistance 34. The capacitance 32 serves to control the current supplied to the resistance 24 and thereby controls the magnitudes of the positive voltage impulses introduced in the control circuit 14. Moreover, the capacitance 32 serves to control the maximum number of consecutive impulses of positive voltage which render the electric valve means 9 conductive.

The operation of the embodiment of my invention diagrammatically shown in Fig. 1 will be explained by considering the system when it is arranged to operate to effect energization of the welding circuit 1 for a predetermined interval of time. When the switch 33 is in the position shown in the drawings, the capacitance 32 will be discharged and the electric valve means 9 will be maintained non-conductive by virtue of the negative unidirectional bias voltage impressed on control member 12 by resistance 19 and capacitance 20. If the switch 33 is moved to the lower position, the inductive device 25 will operate to charge the capacitance 32 through a circuit including secondary winding 30, unidirectional conducting device 26 and resistance 24, establishing on the lower plate of capacitance 32 a positive charge. Since only unidirectional current will flow in this circuit, the voltage appearing across the terminals of resistance 24 will be periodic and the magnitude of this voltage will depend upon the rate of charging the capacitance 32, or, in other words, will depend upon the current in this circuit. By the proper adjustment of tap 18 associated with resistance 17, the negative unidirectional bias voltage may be adjusted so that the voltage introduced in the circuit 14 by resistance 24 is sufficient to render the electric valve 9 conductive. Since the capacitance 32 is now partially charged, the next succeeding impulse of current flowing through the resistance 24 will be smaller in magnitude than the preceding one due to the fact that the net voltage acting on the circuit is substantially reduced by virtue of the charge in capacitance 32. It is to be understood that by adjustment of the negative unidirectional bias voltage I provide an arrangement whereby the time of energization of the actuating coil 8 is controlled.

The operation of the arrangement of Fig. 1 may be better understood by referring to the operating characteristics represented in Figs. 2, 3 and 3a. Considering Fig. 2 in particular, the curve A represents the voltage appearing across actuating coil 8 of contactor 5 during one cycle of alternating voltage of the circuit 2. It is assumed that the bridging member 6 of contactor 5 will be maintained in engagement with contacts 7 for a complete cycle of voltage even though the electric valve 9 is unidirectional. The current is maintained through the actuating coil 8 during the negative portion of the cycle by virtue of the inductance thereof. Referring now to Fig. 3 the curves B, C, D, E, F, G, H and J represent the impulses of positive voltage introduced in circuit 14 by resistance 24. The interval between each of these curves represents 360 electrical degrees or one cycle of voltage. The distances $a, b, c, d, e, f, g, h$ represent the charge on capacitance 32 or may be considered to indicate the voltage existing in the circuit 14 due to the charge of capacitance 32. In Fig. 3a, the line $x$ represents the negative bias voltage introduced in circuit 14 by resistance 19 and capacitance 20. The magnitude of this bias voltage, represented by the distance from the line $x$ to zero axis, may be controlled by adjusting contact 18. The portions of curves B', C', D', E' and F' above the zero axis represent the net positive voltage impressed on control member 12, neglecting the voltage drop incident to flow of current through resistance 22. After the time corresponding to the position of curve F', it will be understood that the next succeeding impulse of voltage, represented by curve G', generated by the inductive device 25 will not supply sufficient current to resistance 24 to furnish a voltage sufficient in magnitude to overcome the negative bias voltage and the electric valve means 9 will not be rendered conductive at the time corresponding to the position of curve G'. Accordingly, the actuating coil 8 of contactor 5 will be deenergized and the period of energization of the welding circuit 1 will be terminated. By taking into consideration the inertia of the contactor 5, the time of energization of the welding circuit 1 may be precisely controlled and furthermore the period of energization of the welding circuit 1 is accurately determinable. By increasing the magnitude of the capacitance 22, it is to be understood that the period of energization of the welding circuit 1 will be increased and conversely by decreasing the size of the capacitance 32 the period of energization of the welding circuit 1 will be decreased. Furthermore, the time of energization of the welding circuit 1 may be controlled by adjusting contact 18 to control the negative bias voltage. As the negative bias voltage is increased, the time of energization is decreased; and conversely, as the negative bias voltage is decreased, the time of energization is increased. To reset the circuit, the switch 33 is moved to the upper position discharging the capacitance 32 through the resistance 34.

Although in the arrangement of my invention shown in Fig. 1 I have chosen to supply the periodic voltage or current for charging the capacitance 32 by means of a saturable inductive device, it is to be understood that my invention in its broader aspects may include those arrangements where the periodic voltage or current is generated by other arrangements such as an electric valve periodic current impulse generator.

One of the principal advantages of my invention is the accurate timing control effected by employing a periodic control voltage of peaked wave form. When such a periodic voltage is used, the positive voltage impulses introduced in circuit 14 will also be of peaked wave form to render the electric valve 9 conductive at a predetermined instant in the cycle of voltage of the alternating current circuit 2. Moreover, it is to be noted that the actuating coil of the contactor 5 is connected directly in circuit with the electric valve means 9, thereby eliminating the necessity for expensive auxiliary control equipment.

The arrangement of my invention diagrammatically shown in Fig. 4 is similar in many respects to that shown in Fig. 1 and corresponding elements have been assigned like reference numerals. The electric valve means 9 includes a discharge path the conductivity of which is controlled conjointly by control members 12 and 13. In other words, the electric valve 9 may be maintained nonconductive by impressing on the control member 13 alternating voltages which tend to maintain the electric valve nonconductive and the valve may be rendered conductive by impressing on control member 12 a positive voltage of sufficient magnitude tending to render the control member 13 ineffective and thereby rendering the valve conductive. The electric valve 9 may be of the high vacuum type or it may be of the type employing an ionizable medium such as a gas or a vapor.

In order to impress on the control member 13 a suitable bias voltage tending to maintain the electric valve 9 nonconductive, I employ a circuit 35 including a transformer 36, a voltage divider including a resistance 37 and an adjustable contact 38 and a current limiting resistance 39. The circuit 35 may be energized from any suitable source of current and I have chosen to show the transformer 36 as being connected to the alternating current circuit 2. Although in the arrangement shown the bias voltage impressed on control member 13 is alternating, it is to be understood that I may employ a unidirectional bias voltage if desired.

The operation of the embodiment of my invention shown in Fig. 4 is substantially the same as that explained in connection with the arrangement of Fig. 1. By the adjustment of the contact or tap 38 a predetermined selected bias voltage is impressed on the control member 13 tending to maintain the electric valve 9 nonconductive. The phase of the alternating bias voltage impressed on control member 13 is preferably 180 degrees out of phase with respect to the voltage impressed on anode 10. When the switch 33 is moved to the lower position, there will be impressed on control member 12 a series or train of impulses of positive voltage sufficient to render the electric valve 9 conductive to maintain the contactor 5 in the closed position to effect energization of the load circuit 1 for a corresponding interval of time. As the capacitance 32 becomes charged by the impulses of current supplied by the inductive device 25 through unidirectional conducting device 26 and resistance 24, the magnitude of these impulses progressively decrease in value until the voltage appearing across resistance 24 is insufficient to render the electric valve 9 conductive. When the capacitance 32 is sufficiently charged, the energization of the actuating coil 8 of contactor 5 will be discontinued and the circuit to the primary winding 4 of transformer 3 will be opened, effecting deenergization of the load circuit 1. To reset the circuit, the switch 33 is moved to the upper position thereby discharging the capacitance 32 through the resistance 34.

The arrangement of my invention shown in Fig. 5 is similar in many respects to that of Fig. 1 and corresponding elements have been assigned like reference numerals. In the arrangement of Fig. 5, I employ a control circuit which is susceptible of great precision in accurately determining and controlling the interval of energization of the load circuit 1 by employing an impedance element, such as a resistance 40, for interconnecting the circuit including electric valve 9 and the actuating coil 8 of contactor 5 and the control circuit 14 whereby energy is transferred from the anode-cathode circuit of the electric valve to the control circuit 14, permitting the establishment of additional charges in capacitance 32. This feature is disclosed and broadly claimed in a copending application of Harry L. Palmer, Serial No. 138,776, filed April 24, 1937, entitled Electric control circuits and assigned to the assignee of the present application. By interconnecting the anode-cathode circuit and the control circuit 14, energy is transferred from the former circuit to the latter to build up the charge in capacitance 32 to effect more precise control of the interval or period of energization of the actuating coil 8 by the electric valve means 9. More specifically, I provide an arrangement for utilizing the energy stored in the inductive actuating element 8 of contactor 5 immediately following each period of energization of the inductive actuating element by the electric valve means 9.

The operation of the embodiment of my invention shown in Fig. 5 will be explained by considering the system when it is adjusted to effect energization of the load circuit 1 for an interval of time corresponding to three cycles of the alternating current circuit 2. The electric valve 9 will be maintained nonconductive by the negative unidirectional bias voltage impressed on control member 12 by resistance 19 and capacitance 20, and when the switch 33 is moved to the upper position there will appear across resistance 40 a train of impulses of positive voltage sufficient to overcome the negative bias voltage rendering the electric valve 9 conductive. Referring to the operating characteristics shown in Figs. 6 and 7, the curve K represents the voltage appearing across the inductive actuating coil 8 of contactor 5. The positive portion of this curve represents the voltage impressed thereon through the electric valve 9 by the alternating current circuit 2 and the negative portion thereof represents the voltage appearing across the terminals of the actuating element 8 due to the energy stored in the inductive actuating coil. It will be understood that the unidirectional conducting device 26 is connected in the circuit not only to permit energization of the capacitance 32 by the saturable inductive device 25 during half cycles of predetermined polarity of peaked voltage, but is also connected to permit the utilization of the negative portion of curve K to establish an additional or cumulative charge in capacitance 32. Curves L, M and N of Fig. 7 represent the rectified impulses of voltage supplied by the saturable inductive device 25 and the interval therebetween corresponds to 360 electrical degrees. The amount of energy stored in the capacitance 32 by the first unidirectional impulse of current may be represented by the distance $j$ and the increment of charge stored in the capacitance 32 by utilizing the reactive voltage of the actuating coil 8 may be represented by the distance $k$. It will be understood that the amount of energy transferred to the capacitance 32 by utilizing the stored energy of the actuating coil 8 materially increases the stored energy of capacitance 32 to permit accurate and precise control of the period of energization of the load circuit 1 without sacrificing the precision of control available by rendering electric valve means conductive by the use of voltages of peaked wave form introduced in the control circuit 14. This feature is of great importance where it is desired to render the electric valve means conductive at a predetermined instant and where it is also desirable to effect precise control of the period of energization. As will be understood by referring to Fig. 8, the impulses of voltage represented by curves L', M' and N' are effective to render the electric valve means 9 conductive, but the next succeeding impulse of positive voltage supplied by the inductive device 25 will be ineffective to produce across resistance 40 a voltage sufficient to render electric valve means 9 conductive, in this way effecting energization of the load circuit 1 during a period corresponding to three cycles of voltage of the alternating current circuit 2.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a translating device, an electric valve means interposed between said circuit and said device for energizing said device, said electric valve means including a control member for controlling the conductivity thereof, and a control circuit for energizing said control member comprising means for impressing on said control member a negative unidirectional bias voltage tending to maintain said electric valve means nonconductive, an impedance element and means connected across said impedance element comprising a serially connected source of periodic voltage of peaked wave form, a unidirectional conducting device connected in series relation with said source of voltage of peaked wave form and a capacitance for supplying a predetermined number of impulses of positive voltage to overcome said bias voltage to render said electric valve means conductive for a corresponding number of half cycles of voltage of said alternating current circuit.

2. In combination, an alternating current circuit, a translating device, an electric valve means for energizing said translating device from said alternating current circuit and including a control member, means for providing a unidirectional bias voltage of substantially constant value, a source of voltage of peaked wave form, a capacitance, an impedance element, and a unidirectional conducting device for charging said capacitance from said source of voltage of peaked wave form through said impedance element to provide a control voltage sufficient to overcome said bias voltage to render said electric valve means conductive, said control voltage being responsive to the rate of charging said capacitance to control the maximum number of consecutive half cycles of voltage of predetermined sign of said alternating current circuit during which said electric valve means is rendered conductive.

3. In combination, an alternating current supply circuit, a translating device, an electric valve means for energizing said translating device from said supply circuit and including a control member for controlling the conductivity thereof, means for impressing on said control member a unidirectional bias voltage of substantially constant value, an impedance element connected in series relation therewith, a saturable inductive device for providing an alternating voltage of peaked wave form, a capacitance, and a unidirectional conducting device for charging said capacitance from said inductive device through said impedance element to provide a voltage sufficient to overcome said bias voltage to render said electric valve means conductive for a predetermined number of consecutive half cycles of voltage of predetermined polarity.

4. In combination, an alternating current supply circuit, a load circuit, means for connecting said supply circuit to said load circuit, electric valve means for energizing said first mentioned means and including a control member for controlling the conductivity thereof, and a control circuit for energizing said control member comprising means for providing a unidirectional bias voltage of substantially constant value, an impedance element connected in series relation therewith, a capacitance, a source of voltage of peaked wave form and a unidirectional conducting device for charging said capacitance from said source of voltage of peaked wave form through said impedance element to supply voltage impulses sufficient to overcome said bias voltage to render said electric valve means conductive during a predetermined consecutive number of positive half cycles of voltage of said supply circuit.

5. In an excitation circuit for an electric valve means having a control member, the combination of a source of negative unidirectional bias voltage tending to maintain said electric valve means nonconductive, an impedance element, and means for energizing said impedance element to supply a positive voltage to overcome said bias voltage so as to render the electric valve means conductive comprising a serially-connected source of voltage of peaked wave form and a capacitance connected directly across said impedance element.

6. In an excitation circuit for an electric valve means having a control member, the combination of means for supplying a negative unidirectional bias voltage tending to maintain the electric valve means nonconductive, an impedance element connected in series relation with said means, a capacitance, a unidirectional conducting device and a source of alternating voltage of peaked wave form for charging said capacitance through said impedance element and said unidirectional conducting device to supply positive impulses of voltage progressively decreasing in magnitude to overcome said bias voltage so as to render the electric valve means conductive, said impedance element and said capacitance being proportioned so that only a predetermined number of positive impulses of voltage are impressed on said control member.

7. In an excitation circuit for an electric valve means including two control members for conjointly controlling the conductivity thereof, the combination of means for impressing on one of said control members a bias voltage tending to maintain said electric valve means nonconductive, and means for impressing on the other of said control members impulses of voltage sufficient to overcome the effect of said bias voltage to render said electric valve means conductive comprising an impedance element connected in circuit with the other of said control members, a capacitance, a unidirectional conducting device and a source of periodic current for charging said capacitance through said impedance element and said unidirectional conducting device.

8. In combination, an alternating current circuit, a translating device, electric valve means for transferring energy to said translating device from said alternating current circuit, said electric valve means comprising at least two control members for conjointly controlling the conductivity thereof, means energized from said alternating current circuit for impressing on one of said control members a voltage tending to maintain said electric valve means nonconductive, and means for energizing the other of said memebrs to overcome the effect of said bias voltage to render said electric valve means conductive during a predetermined number of half cycles of voltage of said alternating current circuit comprising an impedance element connected in circuit with the other of said control members, a capacitance, a unidirectional conducting device and a source of alternating voltage of peaked wave form for charging said capacitance through said impedance element and said unidirectional conducting device.

9. In combination, an alternating current circuit, a load circuit, a circuit controlling means for connecting said alternating current circuit to said load circuit and including an actuating coil, an electric valve means connected in circuit with said actuating coil for transmitting current thereto from said alternating current circuit, said electric valve means comprising a control member for controlling the conductivity thereof, means for impressing on said control member a negative unidirectional bias voltage tending to maintain said electric valve means nonconductive, an impedance element connected in circuit with said control member and said means, and means for energizing said impedance element through said actuating coil to impress on said control member a predetermined number of impulses of positive voltage to render said electric valve means conductive to transmit a number of impulses of current to said actuating coil comprising in series relation a capacitance, a unidirectional conducting device and a source of periodic current, said unidirectional conducting device being connected to utilize the reactive voltage appearing across said coil to charge said capacitance during the intervals between said impulses of current.

10. In combination, an alternating current circuit, a translating device having an inductive element, electric valve means for energizing said inductive element from said alternating current circuit during only half cycles of voltage of one polarity, said electric valve means having a control member for controlling the conductivity thereof, and a control circuit for energizing said control member comprising means for impressing on said control member a bias voltage tending to maintain said electric valve means nonconductive, an impedance element, means for energizing said impedance element to supply impulses of voltage to overcome said bias voltage to render said valve means conductive during a predetermined number of half cycles of voltage of said one polarity including a capacitance, a unidirectional conducting device and a source of periodic current for charging said capacitance through said inductive element, said impedance element and said unidirectional conducting device, said unidirectional conducting device being connected to charge said capacitance in accordance with the voltage appearing across said inductive element immediately after each period of energization by said electric valve means.

11. In combination, an alternating current supply circuit, a load circuit, electric translating apparatus for transmitting to said load circuit a predetermined number of half cycles of current derived from said supply circuit and comprising an electric discharge device having a control electrode, means for impressing on said control electrode a bias voltage tending to maintain said electric discharge device nonconducting, control means for said electric discharge device for impressing on said control electrode a predetermined number of positive impulses of voltage progressively decreasing in magnitude and each sufficient to overcome the effect of said bias voltage thereby rendering said electric discharge device conducting for a corresponding number of half cycles of voltage of said supply circuit and comprising peaking means for producing a periodic voltage of peaked wave form, a capacitance, an impedance element, a rectifier connected in series relation with said impedance element and said peaking means for charging said capacitance through said impedance element, said peaking means serving to synchronize the operation of said control means with the voltage of said supply circuit by controlling the phase relation of said positive impulses relative to the voltage of said supply circuit, a switch connected in series relation with said capacitance for initiating the generation of said positive impulses of voltage, and means for supplying said peaking means with current derived from said supply circuit.

12. In combination, an alternating current supply circuit, a load circuit, electric translating apparatus for transmitting to said load circuit a predetermined number of half cycles of current derived from said supply circuit and comprising an electric discharge device having a control electrode, means for impressing on said control electrode a bias voltage tending to maintain said electric discharge device nonconducting, control means for impressing on said control electrode a predetermined number of positive impulses of voltage progressively decreasing in magnitude and each sufficient to overcome the effect of said bias voltage thereby rendering said electric discharge device conducting for a corresponding number of half cycles of voltage of said supply circuit and comprising a saturable inductive device for producing a periodic voltage of peaked wave form, a capacitance, an impedance element and a rectifier for charging said capacitance through said impedance element from said saturable inductive device, said saturable inductive device serving to synchronize the operation of said control means with the voltage of said supply circuit by controlling the phase relation of said positive impulses relative to the voltage of said supply circuit, a switch connected in series relation with said capacitance for initiating the generation of said positive impulses of voltage, and means for energizing said saturable inductive device from said supply circuit.

13. In combination, an alternating current supply circuit, a load circuit, electric translating apparatus for transmitting to said load circuit a predetermined number of half cycles of current derived from said supply circuit and comprising an electric discharge device having a control electrode, means for impressing on said control electrode a bias voltage tending to maintain said electric discharge device nonconducting, control means for impressing on said control electrode a predetermined number of positive impulses of voltage progressively decreasing in magnitude and each sufficient to overcome the effect of said bias voltage thereby rendering said electric discharge device conducting for a corresponding number of half cycles of voltage of said supply circuit and comprising a capacitance, a saturable inductive device for producing a periodic voltage of peaked wave form, an impedance element and a rectifier for transmitting impulses of current through said impedance element from said saturable device, said saturable inductive device serving to synchronize the operation of said control means with respect to the voltage of said supply circuit by controlling the phase relation of said positive impulses of voltage, a switch connected in series relation with said capacitance for initiating the generation of said positive impulses of voltage, a discharge circuit for said capacitance, and phase shifting means connected between said supply circuit and said saturable inductive device for controlling the phase relation of said positive impulses of voltage relative to the voltage of said supply circuit.

14. In combination, an alternating current supply circuit, a load circuit, electric translating apparatus for transmitting to said load circuit a predetermined number of half cycles of current derived from said supply circuit and comprising an electric discharge device having a control electrode, means for impressing on said control electrode a bias voltage tending to maintain said electric discharge device nonconducting, control means for impressing on said control electrode a predetermined number of positive impulses of voltage progressively decreasing in magnitude and each sufficient to overcome the effect of said bias voltage thereby rendering said electric discharge device conducting for a corresponding number of half cycles of voltage of said supply circuit and comprising a saturable inductive device for producing a periodic voltage of peaked wave form, a capacitance, an impedance element and a rectifier for charging said capacitance from said inductive device through said impedance element, said saturable inductive device serving to synchronize the operation of said control means relative to the voltage of said supply circuit, a switch connected in circuit with said capacitance for initiating generation of said positive impulses, and means connected between said supply circuit and said saturable inductive device for adjusting the phase of said positive impulses of voltage relative to the voltage of said supply circuit and for controlling the magnitude of the current transmitted to said load circuit.

GEORGE W. GARMAN.